US006177675B1

United States Patent
Gagnon et al.

(10) Patent No.: US 6,177,675 B1
(45) Date of Patent: Jan. 23, 2001

(54) GAMMA CAMERA SYSTEM HAVING MULTI-RESOLUTION DETECTORS

(75) Inventors: Daniel Gagnon, Twinsburg, OH (US); Stephen D. Miller, Knoxville, TN (US); William G. Hawkins, Shaker Heights, OH (US)

(73) Assignee: Picker International, Inc., Cleveland, OH (US)

( * ) Notice: Under 35 U.S.C. 154(b), the term of this patent shall be extended for 0 days.

(21) Appl. No.: 09/064,458

(22) Filed: Apr. 22, 1998

(51) Int. Cl.[7] .................................................. G01T 1/166
(52) U.S. Cl. .......................................... 250/363.1; 250/369
(58) Field of Search ................................. 250/363.1, 369

(56) References Cited

U.S. PATENT DOCUMENTS

| | | | |
|---|---|---|---|
| 5,565,684 | * 10/1996 | Gullberg et al. | 250/363.04 |
| 5,569,924 | 10/1996 | Plummer . | |
| 5,633,500 | 5/1997 | Morgan et al. . | |
| 5,813,983 | * 9/1998 | DiFilippo et al. | 600/407 |
| 5,917,189 | * 6/1999 | N'Guyen | 250/363.1 |

OTHER PUBLICATIONS

W. G. Hawkins, et al.; "An Intrinsic 3D Wiener Filter For The Deconvolution Of Spatially Varying Collimator Blur," Proc. 1$^{st}$ IEEE International Conf. on Image Processing, vol. II, pp. 163–167, 1994.

W. G. Hawkins, et al.; "Adaptive Fourier Rebinning for SPECT Simultaneous Transmission/Emission Protocol (STEP)," Proceedings of the Computers in Cardiology Conference, Lund, Sweden, 1997.

Bai, et al.; "Slab–by–Slab Blurring Model for Geometric Point Response Correction and Attenuation Correction Using Iterative Reconstruction Algorithms," to appear in the Conf. Record of the IEEE MI, 1998.

C. E. Floyd Jr., et al.; "Dual Collimation Acquisition for High Resolution, Low Noise SPECT," IEEE Trans. on Nuclear Science, vol. 38, No. 2, Apr. 1991, pp. 784–788.

* cited by examiner

Primary Examiner—Constantine Hannaher
(74) Attorney, Agent, or Firm—Timothy B. Gurin; John J. Fry; Eugene E. Clair

(57) ABSTRACT

A gamma camera system includes a rotatable gantry supporting multiple detector heads each capable of receiving radiation from a region of interest of a subject disposed in an examination region. Each of the detector heads include a collimator which substantially defines the resolution and sensitivity of the respective detector head. At least two of the detector heads include collimators providing different resolution. Preferably, one of the collimators provides a detector head with substantially high resolution and another provides a detector head with substantially high sensitivity. An operator selectively combines image data detected by each of the multiple detector heads. If desired, the operator combine the image data from the multiple detector heads in a variety of manners to obtain images of various resolution and sensitivity from a single imaging procedure. The operator may also selectively weight the contribution that the image data from each of the detector heads has in the overall image. As yet another option, the operator may choose to combine only a high energy portion of the image data so as to minimize the amount of scatter events which are included in a final image.

28 Claims, 5 Drawing Sheets

GAMMA CAMERA SYSTEM HAVING MULTI-RESOLUTION DETECTORS

TECHNICAL FIELD

The present invention relates to diagnostic imaging systems. It finds particular application in conjunction with nuclear or gamma camera systems having multiple detector heads.

BACKGROUND OF THE INVENTION

Gamma cameras, also referred to as nuclear cameras, radioisotope cameras, scintillation cameras and Anger cameras, are often used to measure gamma radiation emitted by a body under examination. By measuring the energy and the location of the gamma ray emissions, an image representative of the gamma radiation emitted from the body under examination can be created.

Gamma rays are produced by virtue of introducing one or more radionuclidies into a region of interest within a patient. These radionuclidies decay, thereby emitting gamma radiation characterized by photons having one or more characteristic energies. For example, Tc-99 m emits photons having a photopeak located at approximately 140.5 keV.

Nuclear gamma cameras typically include one or more detector heads which receive the gamma radiation emanating from a patient. Each detector head includes a scintillation crystal which converts incident radiation to flashes of light. Internal electronics convert each flash of light into an indication of the location and energy of each received incident radiation event. A collimator situated in front of the scintillation crystal is used to limit the field of view of the radiation detector and defines the detector's overall resolution and sensitivity (or efficiency). Typically, the detector head is housed in a radiation blocking material, such as a lead housing.

Each detector head is connected to a gantry systems which rotates the detector head about a subject to obtain a complete data set. Rotation of a single detector head 360 degrees about a subject produces a complete data set. To reduce imaging time gamma cameras often contain two or more detector heads coupled to a single gantry system. An example of a gamma camera having two detector heads coupled to a gantry system is described in U.S. Pat. No. 5,569,924 assigned to Picker International, Inc and titled "Transformable Dual Head SPECT Camera System".

As mentioned above, the resolution and sensitivity of a detector head is primarily governed by the type of collimator selected. Typically, a collimator is comprised of lead septa which define a plurality of passages through which radiation may pass to the scintillation crystal. The lead septa serve to substantially block radiation incident on the collimator which is unable to pass directly through one of the plurality of passages to the scintillation crystal. In this way, an approximate location of an origination point of a particular gamma ray incident on the scintillation crystal may be determined.

The resolution of a collimator relates to the ability to spatially distinguish between the origination point of gamma rays incident on the scintillation crystal. If for instance, the collimator included septa which defined extremely long and narrow passages, then the collimator would likely be considered to have high resolution. More particularly, in order for a gamma ray to have passed directly through the long and narrow passage it would have had to originate from a fairly narrow field of view and thus the collimator is better able to spatially resolve the origination point of incident gamma rays. Conversely, if the collimator included septa which defined extremely short and wide passages, then the collimator would likely be considered to have a low resolution.

Inversely related to the resolution of a collimator is the collimator's efficiency or sensitivity (i.e. as resolution gets better sensitivity gets worse and vice versa). The sensitivity of a collimator is defined to be the ratio of the number of gamma rays that pass through the collimator to the scintillation crystal compared to the number of gamma rays that are incident to the collimator. For example, if there were 1000 gamma rays incident the front surface of the collimator, but only 1 gamma ray passed through to the scintillation crystal then the efficiency would be 0.10%. The higher the sensitivity, the more counts the scintillation crystal receives over time. The number of counts received by a detector head is important in order to be able to distinguish pertinent anatomy in an image over noise. Thus, by having higher sensitivity, the time it takes to obtain the necessary amount of counts for a given image is reduced.

Depending on the object or organ to be imaged and the preferences of a physician, the type of collimator selected for a gamma camera's detector heads may vary from one application to another. For example, when conducting brain flow studies which may typically be imaged with a low count rate, a collimator providing low sensitivity but high resolution may be selected. Alternatively, when imaging regions in which large amounts of noise may be present in the final image, the physician may opt for a collimator providing high sensitivity but low resolution.

Unfortunately, the inherent tradeoffs between efficiency and resolution necessitates that a physician select the type of collimator to be used which balances these factors prior to commencing the imaging procedure. If a collimator desired is different than the collimator(s) already on the gamma camera then extra time must be spent in removing the existing collimator from each detector head and replacing each with the type collimator selected. Further, as many gamma cameras today have at least two or three detector heads, it is usually necessary that two or three collimators of each type be kept in inventory for possible use. This, of course, adds to overall cost and logistics.

Additionally, once a collimator type is selected by a physician, images created using different collimators are not normally available since such images would require that the patient be re-injected with a radionuclide after having switched the collimators. Thus, it is often not possible for the physician to re-image a region with other collimator types.

Another difficulty associated with nuclear imaging is that some of the gamma rays detected by the detector head will have resulted from a scatter event. For instance, in Compton scatter, prior to reaching the scintillation crystal a gamma ray collides with an electron in an outer shell of an atom. The scattered gamma ray is of a lower energy level than the incident gamma ray and also experiences a change in direction. Detection of the scattered gamma ray by the scintillation crystal will in many cases detract from overall image quality as the incident direction of the gamma ray is no longer truly indicative of its origination point within the patient being imaged.

Techniques to compensate for the detection of Compton scatter have been proposed. For instance, one technique is described in U.S. Pat. No. 5,633,500 ('500) assigned to Picker International, Inc. titled "Split Window Scatter Correction". In the '500 patent, the number of counts of gamma rays received in several different energy windows are tracked to estimate and make correction for the contribution of scatter in the energy window containing image data. Determining a precise amount of scatter at each location in the energy window containing the image data is typically difficult if not impossible since the scattering events are random and space variant. Thus, while the '500 patent does provide a reliable method of correcting for scatter, such corrections are based on estimates. Further, because gamma rays incident on a detector are tracked and stored for multiple energy windows and not just the energy window containing the image data, additional memory and processing is typically needed.

Therefore, what is needed is a method and apparatus which overcomes the shortfalls discussed above and others.

SUMMARY OF THE INVENTION

The present invention relates to a nuclear gamma camera system having at least two radiation detector heads which are configured to receive radiation emanating from a subject under examination with different resolution and sensitivity.

In one embodiment, the gamma camera system includes three detector heads each having a collimator substantially defining the resolution with which a corresponding detector head receives radiation. A collimator corresponding to a first of the three detector heads is configured to be a substantially high resolution collimator, a collimator corresponding to a second of the detector heads is configured to be a substantially high sensitivity collimator, and a collimator corresponding to a third detector head is configured to be a general purpose collimator. By rotating each of the detector heads 360 degrees about the subject under examination, a complete volumetric data set of the region of interest within the subject is obtained by each of the three detector heads. The data from each of the three detector heads is then stored and selectively combined to produce a final image having an overall image quality (i.e. combined resolution and sensitivity) which is better than that obtainable by combining data from detector heads having the same resolution. Because detector heads having different image resolution capabilities are used, the present invention allows for an operator to selectively combine images data from any combination of the detector heads desired. If not satisfied with a resultant final image, the operator is able to selectively produce an image from a different combination of detector heads or from a single detector head. Thus, images of various overall resolution and sensitivity may be viewed without the need to re-inject the subject with a radiopharmaceutical and perform an additional scan. Also, if it is desired to obtain an image of different resolution or sensitivity, it is not necessary to physically remove and replace each collimator on the gamma camera system. Further, the present invention provides for the ability of the operator to selectively weigh the contribution to the final image the data from each detector head will have, thereby providing even greater flexibility and versatility. In combining image data from each of the detector heads, the present invention also provides an operator with an option to only combine the high energy portions of the detected gamma rays from each detector head in order to minimize the scatter from the final image.

By providing for one of the detector heads in the gamma camera system to be of substantially high sensitivity, the present invention allows for the final image to be obtained in substantially the same time it takes a conventional gamma camera system having the same number of detector heads to image the subject Thus, for example, conventional gamma camera systems having multiple detector heads typically minimize imaging time by rotating each detector head a fraction of the full 360 degrees about the patient and then combine the information from each detector head to obtain a full image. By comparison, the present invention rotates each detector head about the patient the full 360 degrees but at a faster rate which allows for substantially similar imaging times as conventional systems. The present invention is able to accommodate a faster rotational rate of the detector heads given that the detector heads having substantially high sensitivity allow more gamma radiation counts to be detected per period of time.

According to one aspect of the present invention a method of imaging utilizing a gamma camera is provided. The gamma camera includes first and second detectors disposed about an imaging region so as to detect radiation occurring within the imaging region. The first and second detectors each have a radiation sensitive face capable of detecting radiation received at a plurality of axial and transverse coordinates on the face thereof and each has a spatial resolution. The method includes the steps of utilizing the first and second detectors to detect radiation generated by radionuclide decays occurring within the examination region, the first and second detectors having different spatial resolutions, weighting a contribution of which the radiation detected by the first and second detectors have on an image, and generating the image indicative of the weighted contribution of the detected radiation.

In accordance with another aspect of the present invention a method of imaging utilizing a gamma camera is provided. The gamma camera includes first and second detectors disposed about an imaging region so as to detect radiation occurring within the imaging region. The first and second detectors each have a radiation sensitive face capable of detecting radiation received at a plurality of axial and transverse coordinates on the face thereof and each has a spatial resolution.The method includes the steps of utilizing the first and second detectors to detect radiation generated by radionuclide decays occurring within the examination region, the first and second detectors having different spatial resolutions, combining only a high energy portion of the radiation detected by the first and second detectors, and generating the image indicative of the combined radiation.

In accordance with yet another aspect of the present invention, a gamma camera is provided. The gamma camera includes a gantry defining an examination region, a first and second detectors disposed on the gantry and capable of detecting radiation generated by radionuclide decays occurring within the examination region, the first and second detectors having different spatial resolutions, a means for applying a first weighting factor to the radiation received by the first detector and a second weighing factor to the radiation received by the second detector, and a means for combining the radiation received by the first and second detectors in accordance with the first and second weighting factors.

According to still another aspect of the present invention, a gamma camera is provided. The gamma camera including a stationary gantry portion, a rotary gantry portion rotatably mounted to the stationary gantry portion for circumferential movement around an examination region, first and second detectors mounted to the rotary gantry portion to detect radiation generated by radionuclide decays occurring within the examination region, the first and second detectors having different spatial resolutions, a means for combining only a high energy portion of the radiation detected by the first and second detectors, and a means for generating an image indicative of the combined radiation.

One advantage of the present invention is that it allows an operator to selectively combine image data from the multiple detector heads either before or after reconstruction so as to produce images having various resolution and sensitivity from a single imaging procedure in which a patient is injected with a radiophannaccutical only one time.

Another advantage of the present invention is that images of various resolution and sensitivity are obtainable without sacrificing imaging time.

Still another advantage of the present invention is that it is not necessary to interchange collimators on each detector head of a gamma camera system each time an image of different resolution or sensitivity is desired.

Yet still another advantage of the present invention is that the operator may selectively apply a weight value to the image data from each of the multiple detector heads so as to control the contribution of the image data from a given detector head has to the final image.

Still another advantage of the present invention is that individually optimized collimator correction factors may be applied to the data received from each detector head thereby reducing imaging errors attributable to an object being located at various depths from each detector head.

Still another advantage of the present invention is that the operator may selectively choose to combine only a high energy portion of the image data from each detector head so as to produce an image having substantially reduced scatter.

To the accomplishment of the foregoing and related ends, the invention then, comprises the features hereinafter fully described and particularly pointed out in the claims. The following description and the annexed drawings set forth in detail certain illustrative embodiment of the invention. These embodiments are indicative, however, of but a few of the various ways in which the principles of the invention may be employed. Other objects, advantages and novel features of the invention will become apparent from the following detailed description of the invention when considered in conjunction with the drawings.

DETAILED DESCRIPTION OF THE PREFERRED EMBODIMENTS

Figure 1:
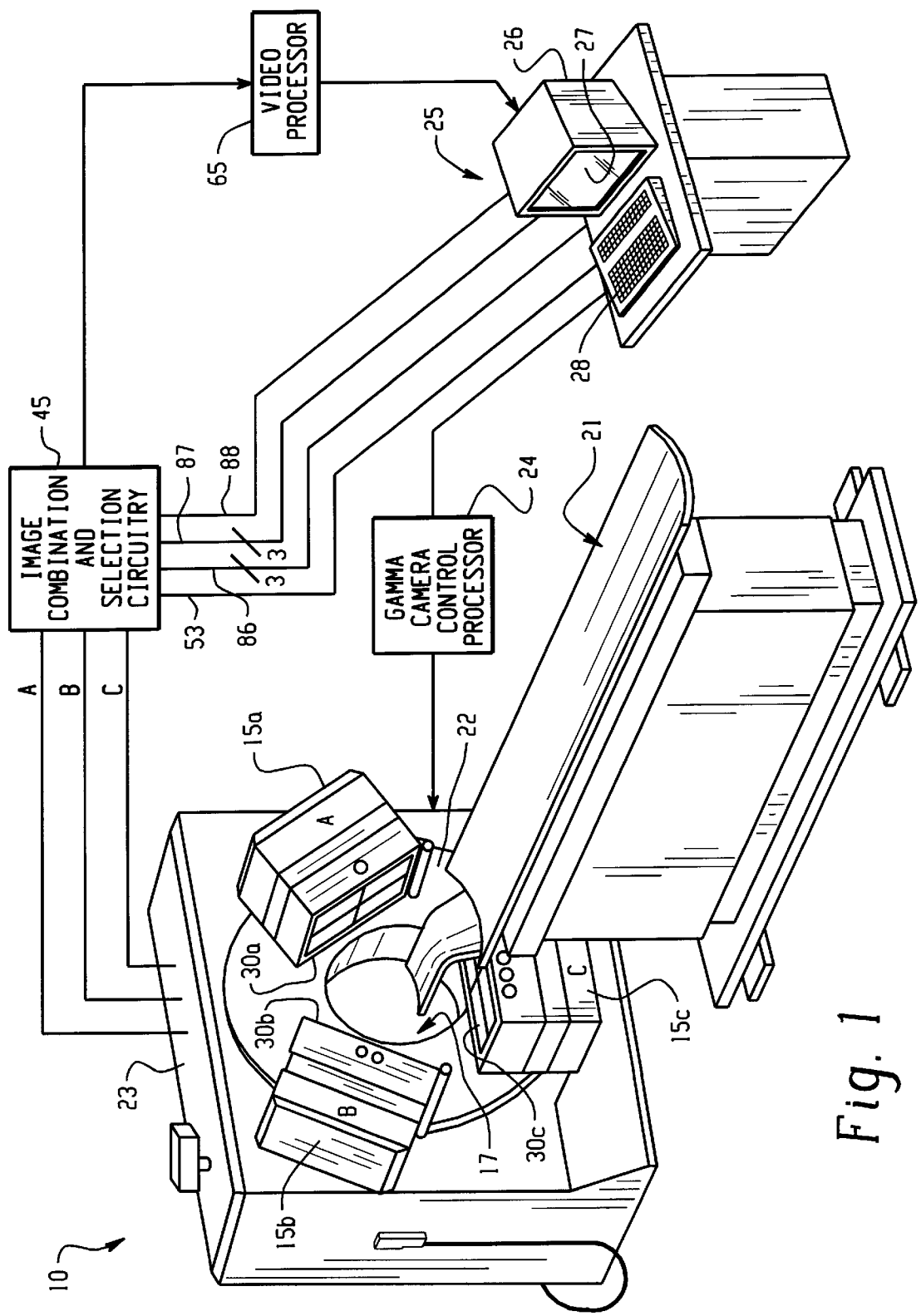
FIG. 1 is an perspective view of a nuclear gamma camera system of the present invention.

The present invention will now be described with reference to the drawings in which like reference numerals are used to refer to like elements throughout.

Turning now to FIG. 1, a gamma camera system 10 is shown having a plurality of radiation detector heads 15a, 15b, 15c (collectively referred to as detector head 15) disposed around a subject examination region 17. It will be appreciated, however, that each detector head 15 may be configured to move relative to one another in accordance with known techniques in the art such that, for example, detector head 15a may be positioned opposite detector head 15b or be positioned at any angle ranging from 90–180 degrees with respect to detector head 15b. A patient couch or other subject support 21 selectively supports a region of interest of a subject or object to be examined in the examination region 17.

The detector heads 15 are mounted to a rotatable gantry portion 22 which is connected to a suitable motor and bearing assembly (not shown) supported by a stationary gantry portion 23. The rotatable gantry portion 22 functions to rotate or index the detector heads 15 around the examination region. Also mounted to the rotating gantry portion 22 are a plurality of mechanical drives (not shown) for moving each of the gamma camera heads 15 independently radially toward and away from the examination region 17 and tangentially to the left and right of the examination region 17. The gamma camera heads 15 are preferably mounted on roller carriages or slide bars for smoother, easier movement.

Movement of the gantry portion 22 and detector heads 15 are controlled by an operator through operator interface 25. More specifically, the operator interface 25 couples to the gamma camera system 10 through gamma camera control processor 24. The gamma camera control processor 24 serves to control rotational and directional movement of the gantry portion 22 and detector heads 15 as well as the on/off state of the detector heads 15. The operator interface 25 includes an operator control panel 26 having a video monitor 27 for providing a human readable display of selected portions of information obtained by the detector heads 15. A keyboard 28 enables the operator to control, for example, the image reconstruction process, the selection of displayed data, the selection of scanning procedures, and other custom operations as more particularly described below.

Figure 2:
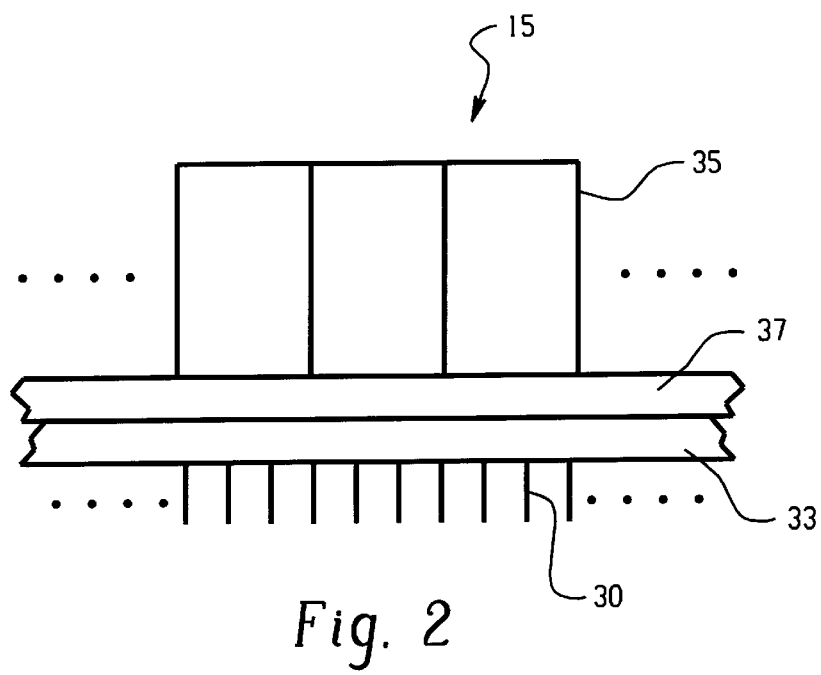
FIG. 2 is a diagrammatic side plan view of a detector head of the nuclear gamma camera system of FIG. 1.

Referring now to FIGS. 1 and 2, the detector head 15 is discussed in more detail. Each detector head 15a, 15b, 15c of the present invention includes a respective collimator 30a, 30b, 30c (collectively referred to as collimators 30) situated in front of a scintillation crystal 33. As discussed in more detail below, at least two of the collimators 30 arc of a different type so as to obtain enhanced imaging ability. The collimators 30 are removably attached to the detector head 15 and serve to substantially define each detector head's 15 overall image resolution and sensitivity. The scintillation crystal 33 is capable of detecting radiation received across a range of axial and transverse coordinated on its face. More particularly, the scintillation crystal 33 responds to radiation passing though the collimator 30 and incident its face by producing a flash of light. An array of photomultiplier tubes 35 which receive the flash of light through a light guide 37 produce electrical signals in response to each light flash. The relative responsive of the closest photomultiplier tubes 35 is indicative of the spatial location x, y of a scintillation event produced by a gamma ray being incident on the scintillation crystal 33. The electrical signals produced in response to the detection of radiation on the scintillation crystal 33 shall hereinafter be referred to as image data.

Figure 3:
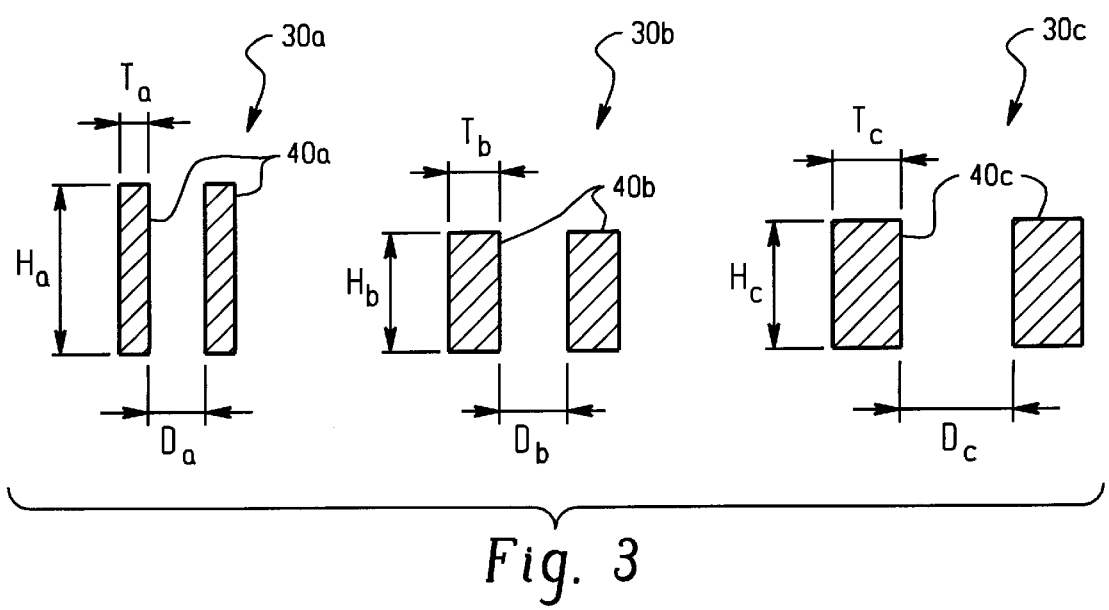
FIG. 3 is a diagrammatic representation of three possible collimator configurations for use with the gamma camera system of FIG. 1.

Referring now to FIG. 3, each of the collimators 30a, 30b, 30c associated with a respective detector head 15 is shown in more detail. According to the present invention, at least two of the collimators 30 of the gamma camera system 10 are of a different configuration so as to allow obtaining data at varying resolution and sensitivity levels. For example, the configuration of the collimators 30 may be selected to be high resolution (which includes high and ultra high resolution), high sensitivity (which includes high and ultra high sensitivity) or general purpose. A high resolution collimator may, for example, have a spatial FWHM (at 10 cm, for a ⅜" thick scintillation crystal) of 7.6 or less and a sensitivity of 181 cpm/$\mu$Ci or less, while a substantially high sensitivity collimator may, for example, have a spatial FWHM of 15 or greater and a sensitivity of 1031 cpm/$\mu$Ci or greater and a general purpose collimator may, for example, have a spatial FWHM and sensitivity ranging between the high resolution and high sensitivity collimators. It will be appreciated that the ranges provided for the FWHM will vary depending on the thickness of the scintillation crystal and how the spatial FWHM is calculated as is know in the art. In one embodiment, collimator 30a is configured to be high resolution, collimator 30b is configured to be general purpose, and collimator 30c is configured to be high sensitivity.

As shown in FIG. 3 each collimator is comprised of lead setpa 40a, 40b, 40c (collectively referred to as septa 40) of varying height H, thickness T, and hole diameter D which collectively define the resolution and efficiency of each collimator. Generally speaking, as the height H or thickness T of the septa 40 increases, or as the hole diameter D decreases, the overall resolution of a given collimator increases. Given that the sensitivity of a given collimator is substantially inversely related to its resolution, varying the above parameters in a manner opposite to that just described would result in the sensitivity of a given collimator to increase. In the present embodiment, the high resolution collimator 30a has septa 40 having a height $H_a$ of 27 mm, a thickness $T_a$ of 0.203 mm, and a hole diameter $D_a$ of 1.2 mm. The general purpose collimator 30b has a height $H_b$ of 25.4 mm, a thickness $T_b$ of 0.254 mm, and a hole diameter $D_b$ of 1.4 mm. The high sensitivity collimator 30c has a height $H_c$ of 25.4 mm, a thickness $T_c$ of 0.305 mm, and a hole diameter $D_c$ of 2.54 mm. Of course, other types of collimators of various families and of various dimensions could alternatively be used in conjunction with the present invention.

Figure 4:
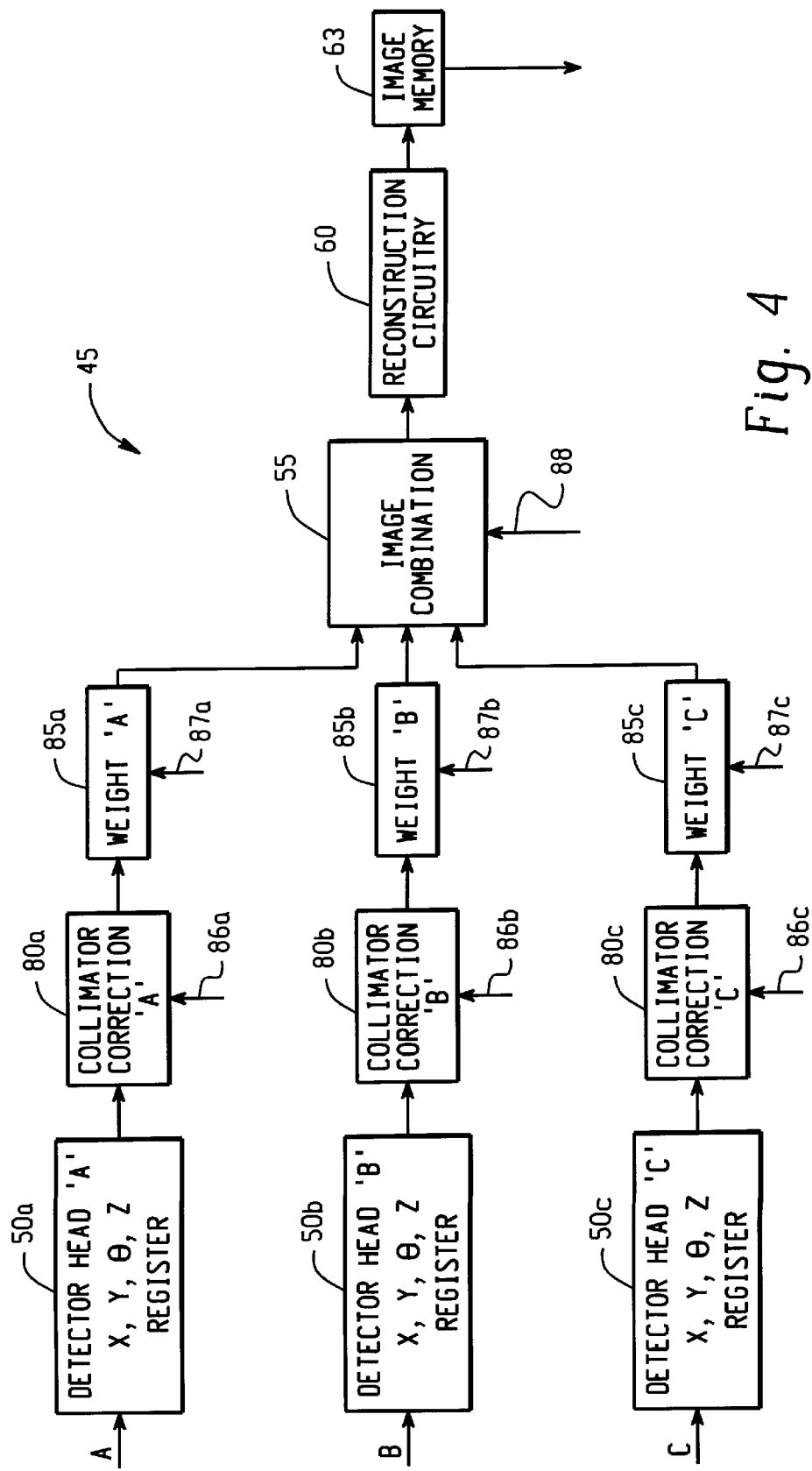
FIG. 4 is a block diagram view of the image combination and selection circuitry of the nuclear gamma camera of FIG. 1.

Referring now to FIGS. 1 and 4, image combination and selection circuitry 45 processes and stores image data received from each detector head 15 via lines A, B, and C as they are moved about the examination region 17. More specifically, for each detector head 15, the spatial location x, y of each incident gamma ray is registered and stored in a respective memory register 50a, 50b, 50c, along with a magnitude z of the resultant sum of energy incident on the scintillation crystal 33 for each location. Further, an angular orientation θ of the respective detector head 15 around the examination region 17 is also stored for future processing.

An output of the registers 50a, 50b, 50c is connected to a respective collimator correction factor circuitry 80a, 80b, 80c (collectively referred to as correction factors 80) which serves to correct for known collimation errors. More particularity, as an object being imaged is moved closer or farther from a detector head 15, the field of view of the detector head at the varying distances changes and thus the detector head's resolution changes. The collimator correction factor circuitry 80 corrects for such variances using techniques known in the art. For example, the collimator correction factor circuitry 80 may function in accordance with the disclosure of "An Intrinsic 3D Wiener Filter for the Deconvolution of Spatially Varying Collimator Blur", published in IEEE *International Conf. On Image Processing*, Vol. II, pp. 163–167, 1994 or "Adaptive Fourier Rebinning for Spect Simultaneous Transmission/emission Protocol (STEP)" *Proceedings of the Counipters in Cardiology Conference*, Lund Sweden, 1997 or "Slab-by-Slab Bluning Model for Geometric Point Response Correction and Attenuation Correction Using Iterative Reconstruction Algrithms", published in *Proceedings of* IEEE *Nuclear Science Symposium, Albuquerque*, N.Mex., Nov. 11–15, 1997, all of which are hereby incorporated by reference. Of course, other collimator correction methodologies may alternative be used. Depending on the type of collimator currently attached to each detector head 15, the operator may selectively apply the appropriate collimator correction factor via lines 86a, 86b, 86c. The output from each collimator correction factor circuitry 80a, 80b, 80c, is coupled to a respective weighting factors 85a, 85b, 85c (collectively referred to as weighing factor 85). As is discussed in more detail below, the weighting factors are coupled to the operator interface 25 via control lines 87a, 87b, 87c, respectively, through which the operator may selectively weight the contribution of the image data from each detector head in the final image. Alternatively, the weighting factors may be determined automatically based on the collimators and types of imaging being performed.

Each weighting factor 85 is coupled to image combination circuitry 55 which serves to combine image data in at a time and in a manner selected by the operator through operator interface 25 via control line 88 as more fully described below. The image combination circuitry 55 is coupled to reconstruction circuitry 60 which serves to reconstruct the combined image data into a format suitable for display. The reconstruction circuitry 60, in turn, is coupled to image memory 63 which stores the reconstructed image until such time as the operator, through the operator controls 25, selects the reconstructed image to be displayed. A video processor 65 couples the image memory 63 to the video monitor 27 and serves to map the reconstructed image data to the appropriate pixel on the video monitor 27 for viewing by the operator or other individuals.

In operation, the present invention provides better image quality and added versatility and flexibility in selecting and viewing images of a subject taken during a single imaging procedure. More specifically, upon positioning a region of interest of a subject into the examination region 17 and injecting the subject with an appropriate radiopharmaceutical, the operator initiates an image read operation through the operator interface 25. In the present embodiment, initiation of an image read operation causes the gamma camera control processor 24 to rotate each of the detector heads 15 360 degrees about the examination region 17 typically at a rate of between 0.01 and 4 revolutions per minute. By virtue of rotating each detector head 15 360 degrees, each of the detector heads 15 is able to compile image data representative of a full three-dimensional volumetric image of the region of interest. Because the present invention provides that at least two, and in the preferred embodiment all three, of the detector heads 15 have collimators 30 of different configurations as discussed above with respect to FIG. 3, the image data acquired and stored by the respective detector heads 15 in registers 50 contain data of varying resolution and sensitivity.

The image data, from each register 50a, 50b, 50c is next passed to the collimator correction circuitry 85 where such data is corrected for errors known to occur by virtue of variations which arise in the distance each detector head 15 is positioned from the imaging region. As the correction factor to apply will depend on the type of collimator 30 coupled to the detector head 15, a correction factor selection signal 86a, 86b, 86c is automatically provided to each collimator correction circuitry 85 from the operator interface 25 via lines 86a, 86b, 86c based on the positioning of the detector heads. Depending on the type of collimator currently coupled to each detector head 15, the operator selects the proper collimator correction factor to be applied.

Prior to combining the corrected image data, the present embodiment also provides the operator with an opportunity to weight the amount the image data from each detector head 15 shall contribute to the final image. The image data from the collimator correction circuitry 85 is next passed to weighting circuitry 85. The weighing circuitry 85 allows the operator to selectively weigh the contribution that image data obtained from each respective detector head 15 shall contribute to the final image. The weight value applied is selected by the operator through operator interface 25 via lines 87a, 87b, 87c. If no weight values are applied, then the present embodiment places an equal weight on the image data obtained from each detector head 15. If, however, the operator detennines, for instance, that the resolution of a particular image is more important than its sensitivity, the operator may assign a greater weight to the output of the detector head 15 providing greatest resolution. Thus, if detector head 15a provides greatest resolution it may be weighted to contribute 60% to the final image while the remaining two detector heads 15b, 15c each contribute only 20%.

Once weighted, the image data from the weight circuitry 85 is provided to the image combination circuitry 55 for combining. The image combination circuitry 55 is controlled by the operator through the operator interface 25 and may be called to combine the image data from each register 50 in variety of fashions and at a variety of times. In the present embodiment, for example, the image combination circuitry 55 is configured to sum the weighted image data from each detector head 15 for each x, y, θ to obtain a resulting combined count cc at each location. More specifically, for a given $x_1, y_1, \theta_1$ the equation is as follows: $c_{c1} = w_a * C_{a1} + W_b * C_{b1} + w_c * c_{c1}$ where $w_a, W_b, w_c$ represent the respective weight value applied to the image data received from each detector head 15 via weighing circuitry 85, and $c_{a1}, c_{b1}, c_{c1}$ represent the detected counts for each detector head at the given $x_1, y_1, \theta_1$ location. It will be appreciated that if the operator desires that image data from a particular one or more detector heads 15 not be included in the final image, those particular weighting factor may be set to zero via lines 87a, 87b, 87c. Thus, by selectively weighing the image data from each detector head 15 for a given imaging procedure, the operator may obtain an image of a desired resolution and sensitivity without requiring physically removing and replacing the collimators on each detector each time a different resolution or sensitivity is needed. It will further be appreciated that alternative combination and weighting techniques may be used which, for example, use statistical frequency moments or other information content of the data.

Further, it will be appreciated that the present invention provides a manner in which multiple images of various resolution and sensitivity levels may be obtained from a single imaging procedure. More particularly, as discussed above, following an imaging procedure a volumetric set of image data from each detector head 15 is stored in a respective register 50a, 50b, 50c. As such, following the imaging procedure, the operator may at any time apply a weight value to the image data stored in each register 50a, 50b, 50c via lines 87a, 87b, 87c and then send a signal via line 88 to the image combination circuitry 55 to combine the weighted image data to produce and display a final image. If, however, the operator determines for any reason that it would be beneficial to obtain images of varying degrees of resolution and sensitivity, then the operator may at a later time send a signal to each weighting circuitry 85 via lines 87a, 87b. 87c varying one or more of the weights to be applied to the image data stored in registers 50a, 50b, 50c. Next, the opeator would again send a signal to the image combination circuitry 55 via line 88 to combine the newly weighted image data and produce another final image having a different overall resolution and sensitivity. This process of varying the weights and combining the weighted image data may be repeated as often as the operator desires. Thus, the present invention allows for images of varying resolution and sensitivity to be reproduced from a single image scan of a subject.

Figure 5:
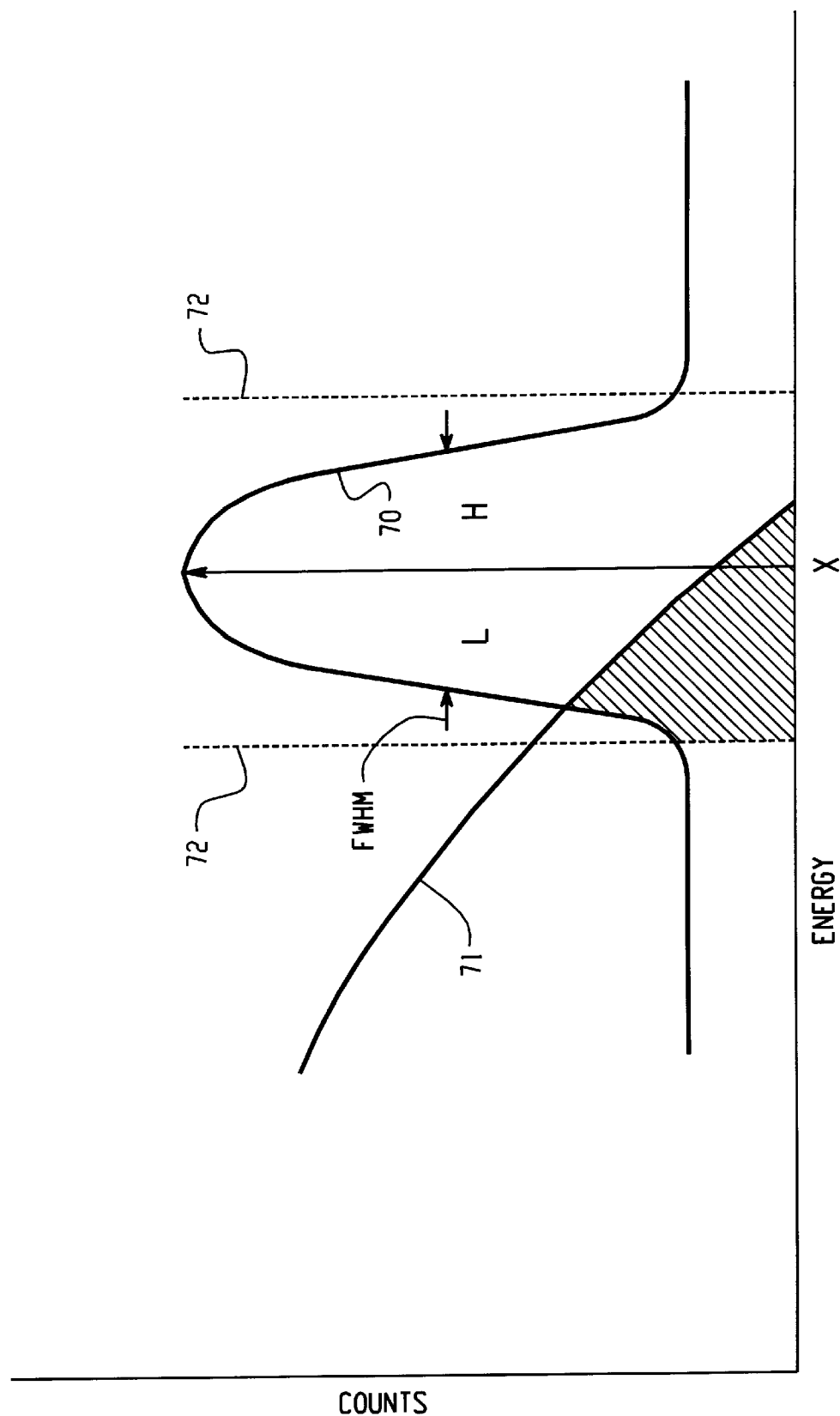
FIG. 5 depicts how a response of a typical gamma camera detector may be divided to minimize scatter events from being introduced into a final image.

The image combination circuitry 55 may also be selected by an operator to combine image data from the multiple detector heads 15 in a manner which substantially eliminates the effect of scatter in the final image without requiring additional processing or memory. More specifically, referring to FIG. 5, there is shown an acquisition curve 70 for a given detector head, i.e. detector head 15a, centered about a primary energy value X for the radiopharmaceutical injected into the subject to be imaged. For example, for the radiopharmaceutical $^{99m}$Tc, the primary energy value X is 140kev. Also shown is a scatter curve 71 showing where scatter overlaps with the acquisition curve 70 within a given window 72. As discussed in the background section, a final image (I) reproduced from image data of single detector head 15a includes both primary events (P) and scattered events (S). In other words: I is a function of (P)+(S). In the present invention, however, the acquisition curve 70 maybe divided into low energy portion (L) defined as the portion of the acquisition curve 70 below the primary energy value X, and a high energy portion (H) defined as the portion of the acquisition curve 70 above the primary energy value X. Because the primary events are known to have a Gaussian distribution about the primary energy value X, the primary events can be divided into: P=P/2 (H)+P/2 (L). However, scattered events result from primary events which have lost energy. As such, since virtually all scattered event inherently have a lower energy level than primary gamma rays, few if any scattered events fall into the high energy portion (H). Thus, I may be viewed as a function of P/2 (H)+P/2 (L)+S (L).

In order to substantially eliminate the scattered events from the final image upon request by the operator, the present invention drops all events obtained in the low energy portion (L). As substantially all scatter events are in the low energy portion (L), dropping this portion virtually eliminates scatter events from the final image (I). To account for the primary events lost by also dropping the low energy portion, the high energy portion (H) of one or more of the remaining detector heads, i.e. detector heads 15b, 15c are added back into the final image. Advantageously, given the varying configurations of collimators used with each detector head 15, a detector head having a high sensitivity (and thus allowing for a high count rate) may be selected to replace the primary events lost by dropping the low energy portion of a higher resolution detector. By utilizing a higher sensitivity detector head, the present invention allows the counts needed to image the subject to be obtained without substantial delay which would otherwise occur if only high resolution detector heads were used. Upon request by an operator through the operator's interface 25, the high energy portion (H) of the image data from each register 50 is combined by the image combination circuitry 55. Thus, for example, when combining image data from the high energy portion (H) of all three detector heads 15, the image combination circuitry 55 combines the image data such that I is a function of $P_{15a}/2$ (H)+$P_{15b}/2$ (H)+$P_{15c}/2$ (H).

Referring again to FIG. 4, once the image data from each register 50 is combined by the image combination circuitry 55, the resulting data is reconstructed by reconstruction circuitry 60 and stored in image memory 63. Following storage of the reconstructed data in image memory 63 the operator may request immediate display of the image data on the video monitor 27 or alternatively may request that the image be displayed at some future time.

Figure 6:
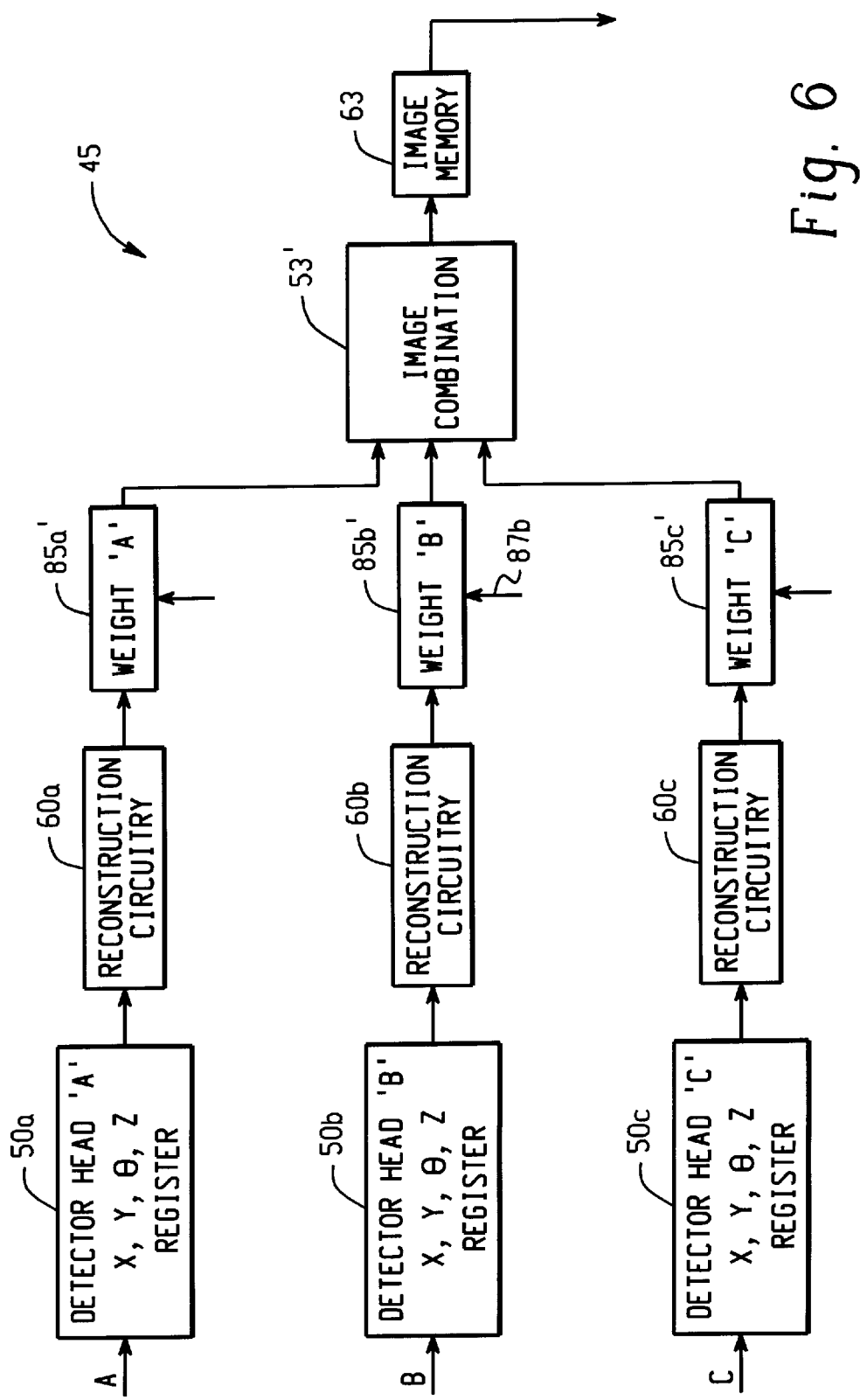
FIG. 6 is a block diagram of the electronic circuitry associated with the gamma camera system of an alternative embodiment of the present invention.

Referring now to FIG. 6, yet another embodiment of the present invention is depicted in which the reconstruction processor 45 performs image reconstruction prior to combining the image data from each particular detector head 15. More specifically, after storing the image data from each detector head 15 into the respective register 50, the present embodiment feeds the Image data to a respective reconstruction circuitry 60a, 60b, 60c. The resultant reconstructed data is then feed to weighing, circuitry 85a', 85b' and 85c', through which the operator can selectively determine the contribution of which the reconstructed image data from each detector head 15 has in the final image. The weighted image is passed to the image combination circuitry 55' where the data is summed in a manner similar to that described above with respect to the previous embodiment except that the data in this embodiment has already been reconstructed. The resultant combined reconstructed data is then feed to the image memory 63 for eventual display on the video monitor 27. Combining image data after reconstruction allows for known image compensation techniques to be used during reconstruction, however, applying, such techniques may lead to longer processing times. Of course, collimator correction factors, scatter correction and other features of the present invention described above may also be incorporated into the present embodiment. Further, it will be appreciated that rather then using three reconstruction circuits 60a, 60b, 60c, it would be possible to use a single reconstruction circuitry sequentially to reconstruct the image data received and stored by each register 50a, 50b, 50c.

The invention has been described with reference to the preferred embodiments. Obviously, modifications and alterations will occur to others upon reading and understanding the preceding detailed description. It is intended that the invention be construed as including all such modifications, alterations and others insofar as they come within the scope of the appended claims or their equivalence thereof.

What is claimed is:

1. A method of imaging utilizing a gamma camera including first and second detectors disposed about an imaging region so as to detect radiation occurring within the imaging region, each detector having a radiation sensitive face, each detector capable of detecting radiation received at a plurality of axial and transverse coordinates on the face thereof and having a spatial resolution, the method comprising the steps of:
   utilizing the first and second detectors to detect radiation generated by radionuclide decays occurring within the examination region, the first and second detectors having different spatial resolutions, each detector providing data indicative of the detected radiation thereby;
   applying a first selected weighting factor to the data provided by the first detector and a second selected weighting factor the data provided by the second detector; and
   generating an image using the respective weighted data from the first detector and the second detector.

2. The method of claim 1, wherein the first detector includes a first collimator and the second detector includes a second collimator, the first and second collimators defining the spatial resolution of the first and second detectors.

3. The method of claim 2, wherein the first and second collimators are a different one of a high resolution collimator, a high sensitivity collimator, and a general purpose collimator.

4. The method of claim 1, wherein the gamma camera includes a third detector disposed about the imaging region so as to detect radiation occurring within the imaging region, the third detector having a radiation sensitive face and capable of detecting radiation received at a plurality of axial and transverse coordinates on the face thereof and having a spatial resolution, the method comprising the steps of:
   utilizing the third detector to detect radiation generated by radionuclide decays occurring in the examination region, the third detector providing data indicative of the detected radiation thereby;
   applying a third selected weighting factor to the data provided by the third detector; and
   using the weighted data from the third detector in generating the image.

5. The method of claim 4, wherein the spatial resolution of the third detector is the same as the spatial resolution of one of the first and second detectors.

6. The method of claim 4, wherein the spatial resolution of the third detector is different than the spatial resolution of the first and second detectors.

7. The method of claim 6, wherein the first detector includes a first collimator, the second detector includes a second collimator, and the third detector includes a third collimator, the first, second, and third collimators defining the spatial resolution of the first, second, and third detectors.

8. The method of claim 7, wherein the first collimator is a high resolution collimator, the second collimator is a high sensitivity collimator, and the third collimator is a general purpose collimator.

9. The method of claim 1, further comprising the step of:
   applying a first collimator collection factor to the radiation received by the first detector and applying a second collimator correction factor to the radiation received by the second detector.

10. The method of claim 1, wherein the first selected weighting factor applied to data from the first detector in generating the image is different than the second selected weighting factor applied to the data from the second detector in generating the image.

11. The method of claim 1, further comprising the step of combining only a high energy portion of the detected radiation from the first and second detectors.

12. The method of claim 11, wherein the first detector includes a first collimator and the second detector includes a second collimator, the first and second collimators defining the spatial resolution of the first and second detectors.

13. The method of claim 12, wherein the first and second collimators are a different one of a group of collimators consisting of a high resolution collimator, a high sensitivity collimator, and a general purpose collimator.

14. A method of imaging utilizing a gamma camera including first and second detectors disposed about an imaging region so as to detect radiation occurring within the imaging region, each detector having a radiation sensitive face, each detector capable of detecting radiation received at a plurality of axial and transverse coordinates on the face thereof and having a spatial resolution, the method comprising the steps of:
utilizing the first and second detectors to detect radiation generated by radionuclide decays occurring within the examination region, the first and second detectors having different spatial resolutions;
providing data indicative of radiation detected within an energy window;
combining only data indicative of a high energy portion of the radiation detected for a single energy peak within the energy window by the first and second detectors; and
generating an image indicative of the combined data.

15. The method of claim 14, wherein the first detector includes a first collimator and the second detector includes a second collimator, the first and second collimators defining the spatial resolution of the first and second detectors.

16. The method of claim 15, wherein the first and second collimators are a different one a group of collimators consisting of a high resolution collimator, a high sensitivity collimator, and a general purpose collimator.

17. A gamma camera comprising:
a gantry defining an examination region;
first and second detectors disposed on the gantry and capable of detecting radiation generated by radionuclide decays occurring within the examination region, the detectors providing data indicative of the detected radiation, the first and second detectors having different spatial resolutions;
weighting means for applying a first selected weighting factor to the data indicative of the radiation received by the first detector and a second selected weighing factor to the data indicative of the radiation received by the second detector; and
processing means for combining the data indicative of radiation received by the first and second detectors in accordance with the first and second weighting factors, whereby the relative contribution in combining the data from the first and second detectors is selectively variable.

18. The gamma camera of claim 17, wherein the first detector includes a first collimator and the second detector includes a second collimator, the first and second collimators defining the spatial resolution of the first and second detectors.

19. The gamma camera of claim 18, wherein the first and second collimators are a different one a group of collimators consisting of a high resolution collimator, a high sensitivity collimator, and a general purpose collimator.

20. The gamma camera of claim 18, further comprising collimator correction circuitry capable of correcting for errors occurring during the detection of radiation by the first and second detector heads.

21. The gamma camera of claim 17, further comprising:
a third detector disposed on the gantry and capable of detecting radiation generated by radionuclide decays occurring within the examination region.

22. The gamma camera of claim 21, wherein the third detector includes a third collimator defining a spatial resolution of the third detector, the third collimator being one of a high resolution collimator, a high sensitivity collimator and a general purpose collimator.

23. The gamma camera of claim 17, wherein the processing means for combining the radiation received by the first and second detectors includes energy selecting means for selectively combining only a high energy portion of the radiation received by the first and second detectors.

24. A gamma camera comprising:
a stationary gantry portion;
a rotary gantry portion rotatably mounted to the stationary gantry portion for circumferential movement around an examination region;
first and second detectors mounted to the rotary gantry portion to detect radiation generated by radionuclide decays occurring within the examination region and provide data indicative of the detected radiation within a predetermined window, the first and second detectors having different spatial resolutions;
processing means for combining substantially data indicative of a high energy portion of a single energy peak within the window of the radiation detected by the first and second detectors; and
means for generating an image indicative of the combined data substantially indicative of the high energy portion of the radiation of the single energy peak within the window.

25. The gamma camera of claim 24, wherein the first detector includes a first collimator and the second detector includes a second collimator, the first and second collimators defining the spatial resolution of the first and second detectors.

26. The gamma camera of claim 25, wherein the first and second collimators are a different one of a high resolution collimator, a high sensitivity collimator, and a general purpose collimator.

27. The gamma camera of claim of claim 24, further comprising: means for weighting a contribution of which the radiation detected by the first and second detectors have on the image.

28. A method of imaging utilizing a gamma camera including first and second detectors disposed about an imaging region so as to detect radiation occurring within the imaging region, each detector having a radiation sensitive face, each detector capable of detecting radiation received at a plurality of axial and transverse coordinates on the face thereof and having a spatial resolution, the method comprising the steps of:
utilizing the first and second detectors to detect radiation generated by radionuclide decays occurring within the examination region;
collimating the radiation detected by the first detector with a first parallel hole collimator having a first spatial resolution and collimating the radiation detected by the second detector with a second parallel hole collimator having a different spatial resolution than that of the first collimator, wherein the first and second parallel hole collimators are a different one of a high resolution collimator, a high sensitivity collimator, and a general purpose collimator;
weighting a contribution of which the radiation detected by the first and second detectors have on an image; and
generating the image indicative of the weighted contribution of the detected radiation.

* * * * *